(12) United States Patent
Ryen

(10) Patent No.: US 11,912,599 B2
(45) Date of Patent: Feb. 27, 2024

(54) ENZYMATIC PURIFICATION OF WATER

(71) Applicant: Pharem Biotech AB, Uppsala (SE)

(72) Inventor: Martin Ryen, Uppsala (SE)

(73) Assignee: Pharem Biotech AB, Uppsala (SE)

( * ) Notice: Subject to any disclaimer, the term of this patent is extended or adjusted under 35 U.S.C. 154(b) by 754 days.

(21) Appl. No.: 16/486,067

(22) PCT Filed: Feb. 14, 2018

(86) PCT No.: PCT/SE2018/050137
§ 371 (c)(1),
(2) Date: Aug. 14, 2019

(87) PCT Pub. No.: WO2018/151648
PCT Pub. Date: Aug. 23, 2018

(65) Prior Publication Data
US 2020/0189947 A1    Jun. 18, 2020

(30) Foreign Application Priority Data

Feb. 15, 2017 (SE) .................................. 1750142-0

(51) Int. Cl.
*C02F 3/34* (2023.01)
*C02F 3/10* (2023.01)
(Continued)

(52) U.S. Cl.
CPC .............. *C02F 3/342* (2013.01); *C02F 3/108* (2013.01); *C02F 3/348* (2013.01);
(Continued)

(58) Field of Classification Search
None
See application file for complete search history.

(56) References Cited

U.S. PATENT DOCUMENTS

| 5,217,616 A | * | 6/1993 | Sanyal | ..................... B01J 19/30 |
| | | | | 210/150 |
| 2010/0089822 A1 | * | 4/2010 | Terry | ........................ C02F 3/28 |
| | | | | 210/603 |

(Continued)

FOREIGN PATENT DOCUMENTS

| CN | 101689638 | 3/2010 |
| DE | 10244915 A1 | 4/2004 |

(Continued)

OTHER PUBLICATIONS

Jorgensen et al., "Cloning, Sequence, and Expression of a Lipase Gene from Pseudomas cepacian: Lipase Production in Heterologous Hosts Requires Two Pseudomonas Genes", Journal of Bacteriology, Jan. 1991, vol. 173, No. 2, p. 559-567, 9 pages. (Year: 1991).*

(Continued)

*Primary Examiner* — Jonathan M Peo
(74) *Attorney, Agent, or Firm* — MARSHALL, GERSTEIN & BORUN LLP

(57) ABSTRACT

The present invention aims at improving the purification of sewage water in water treatment systems, by the use of enzymes. Thus a filter comprising enzymes and a method for producing said filter are provided, as well as the use of said filter, a module system for comprising said filter, and use of said module system.

20 Claims, 1 Drawing Sheet

(51) Int. Cl.
   *C02F 101/30*   (2006.01)
   *C02F 103/34*   (2006.01)
(52) U.S. Cl.
   CPC .. *C02F 2101/305* (2013.01); *C02F 2101/306* (2013.01); *C02F 2103/343* (2013.01); *C02F 2203/006* (2013.01)

(56) References Cited

U.S. PATENT DOCUMENTS

| | | | |
|---|---|---|---|
| 2010/0209968 A1 | 8/2010 | Akers et al. | |
| 2011/0127208 A1 | 6/2011 | Sadowsky et al. | |
| 2013/0098837 A1* | 4/2013 | Dash | C02F 3/341 210/606 |
| 2013/0196405 A1* | 8/2013 | Singh | D01D 5/34 428/394 |
| 2013/0236944 A1* | 9/2013 | Bensoussan | C02F 3/10 435/189 |
| 2013/0270165 A1* | 10/2013 | Shevitz | C12M 29/04 210/205 |
| 2014/0102976 A1* | 4/2014 | Mansour | C02F 3/342 210/257.2 |
| 2018/0230033 A1* | 8/2018 | Cumbie | C02F 3/2866 |

FOREIGN PATENT DOCUMENTS

| | | |
|---|---|---|
| EP | 1226882 A1 | 7/2002 |
| EP | 2716608 A1 | 4/2014 |
| FR | 2996548 A1 | 4/2014 |
| JP | 2002028692 A | 1/2002 |
| RU | 2617937 C2 | 4/2017 |
| WO | WO-2012/007536 A1 | 1/2012 |

OTHER PUBLICATIONS

Koudelakova et al., "Haloalkane dehalogenases: Biotechnological applications", Biotechnol. J., 2013, 8, 32-45, 15 total pages (Year: 2013).*
Ammann et al., "Immobilization of defined laccase combinations for enhanced oxidation of phenolic contaminants," Appl Microbiol Biotechnol 98:1397-1406 (2014).
ENDETECH Report Summary, Project ID: 282818, 4 pages (2015). Retrieved from the internet http://cordis.europa.eu/result/rcn/168997_en.html.
International Search Report and Written Opinion from International Application No. PCT/SE2018/050137 dated Jun. 6, 2018.
Liu et al., "How to achieve high-level expression of microbial enzymes," Bioengineered 4(4)212-223 (2013).
NyTeknik, Ny svensk metod renar bort lakemedelsrester i (Nov. 13, 2015). Retrieved from the internet https://www.nyteknik.se/energi/ny-svensk-metod-renar-bort-lakemedelsrester-6343631.
Romaskevic et al., "Applicatin of polyurethane-based materials for immobilization of enzymes and cells: a review," CHEMIJA 17(4):74-89 (2006).
Search Report from Swedish Application No. 1750142-0 dated Feb. 15, 2017.
Office Action from Russian Application No. 2019128849 dated Jul. 2, 2021.
Office Action from European Application No. 18706583.4 dated Apr. 4, 2022.
Search Report from Russian Application No. 2019128849 dated Jun. 21, 2021.
Office Action from Malaysian Application No. PI2019004676 dated Apr. 8, 2022.
Office Action (translation) from Chinese Application No. 201880012169.5 dated Jun. 24, 2022.

* cited by examiner

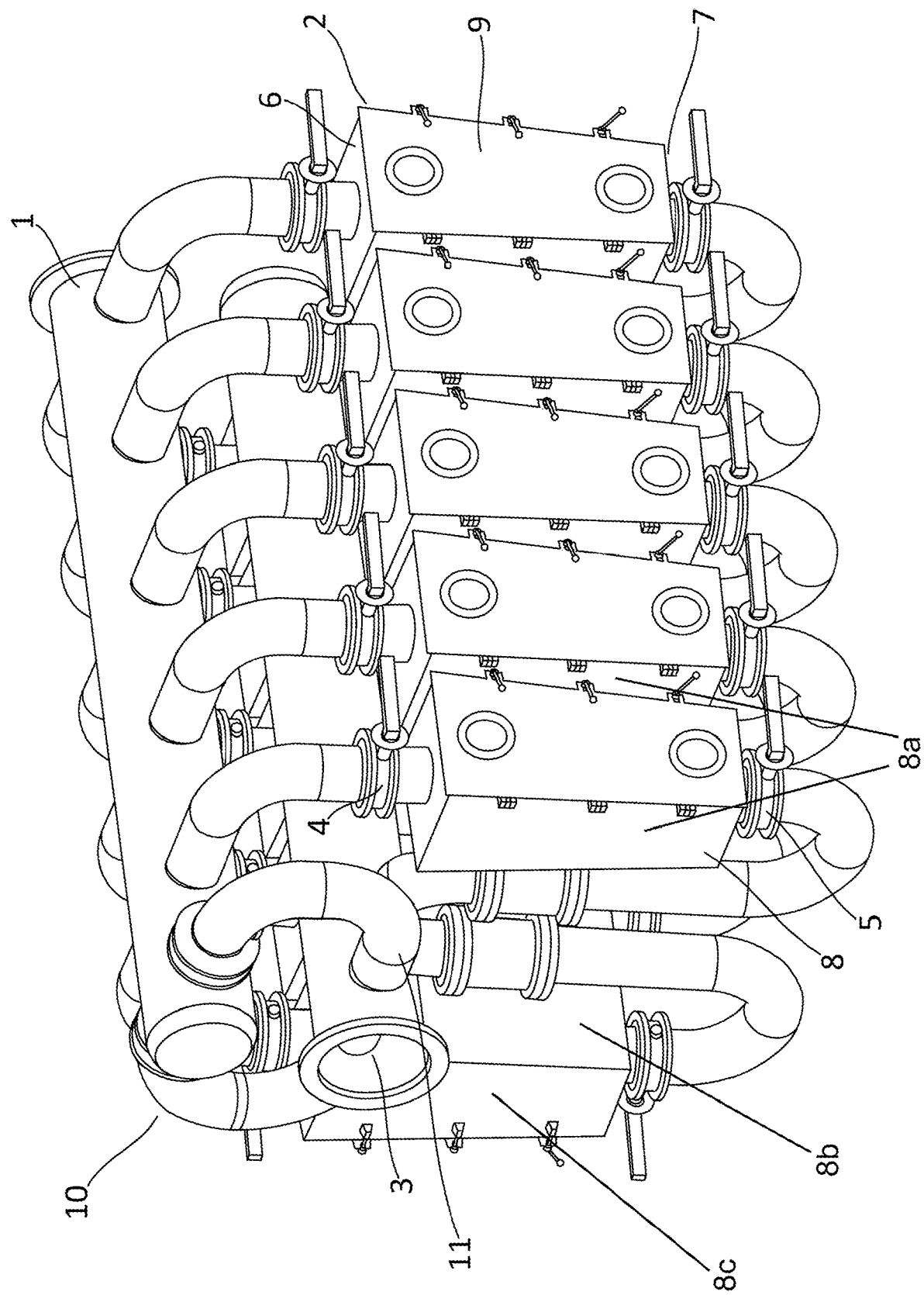

ENZYMATIC PURIFICATION OF WATER

CROSS-REFERENCE TO RELATED APPLICATIONS

This is a U.S. National Phase of International Application No. PCT/SE2018/050137, filed Feb. 14, 2018, which claims priority to Swedish Application No. 1750142-0, filed Feb. 15, 2017.

TECHNICAL FIELD

The invention relates to the field of purification of water from organic substances using enzymes.

BACKGROUND ART

The pollution of water is a serious environmental problem. Today, the water treatment of sewage water, after use of mechanical filters, generally comprises use of activated sludge, comprising sedimentation of gross solids, followed by aerobic degradation of the organic matter and a subsequent sedimentation to remove the biomass. The water may thereafter go through a chemical treatment. However, certain pollutants like environmentally hazardous organic substances, such as for instance drug molecules, are not completely eliminated from the waters by conventional sedimentation techniques. In fact, a very little amount of drug molecules are eliminated by the sedimentation of sewage water. As a consequence, many environmentally hazardous organic substances remain in the water and have an environmentally negative impact, and in particular exert negative effects on aquatic life.

Periodic Report Summary 2—ENDETECH (Enzymatic Decontamination Technology) (European Commission, CORDIS, Sejourne, Florence, 196264-N1) discusses an objective to develop technology which aims at eliminating persistent pharmaceutical pollutants from water using immobilized enzymes in a bioreactor. ENDETECH discloses immobilisation of enzymes on membranes and on beads.

WO 2009/076711 A1 discloses using polypeptides for degrading chlorinated s-triazines, which are pest control agents. Polypeptides with enhanced degradation ability, compared to AtzA are identified, expressed and brought into contact with for instance water, to eliminate the s-triazines present therein.

WO 2012/007536 A1 discloses methods using enzymes for inactivation of antibiotics in the environment, and in particular inactivating antibiotics from waste and waste water effluents before they reach the environment. The enzymes may be comprised in a composition that is applied to any effluent to be treated, or may be immobilized on a solid support, preferably silica or glass beads or a membrane.

None of the above mentioned methods are appropriate for an efficient large scale purification of water from environmentally hazardous organic substances.

The method of using bioreactors comprising enzymatic membranes for the purpose of water purification includes a passage of the water through the membrane, and consequently there may be substances in the water that do not pass through the membrane and thereby will remain on the upstream side of the membrane. This may have a negative effect on the efficiency of the enzymatic membrane, and consequently the efficiency of the bioreactor. Furthermore, the production of biomembranes can be costly.

There is therefore a need to improve the purification methods in order to eliminate most of, if not all, environmentally hazardous organic substances present in the sewage water to a lower cost and with a larger efficiency.

SUMMARY OF THE INVENTION

The present invention aims at improving the purification of sewage water by the use of enzymes. The advantage of using an enzymatic purification instead of a chemical purification is that the environmental footprint will be smaller. With chemical treatments, there is a need to safely handle the chemicals before and after use in a manner that is environmentally safe and follows regulatory protocol. Chemicals are not specific in their activity and can therefore exert other activities than the desired activity. If the chemicals enter the environment they will consequently have an effect on everything they will encounter. The advantage of using enzymes is that they are very specific in their activity, and with a time-limited period of activity. Thus any downstream problems, as above for chemicals, are minimized, which provides a substantial environmental advantage.

The present invention is aimed at solving the problem of improving the present water purification methods in order to eliminate most of, if not all, environmentally hazardous organic substances present in sewage water to a lower cost and with a larger efficiency. This is attained by a method of purifying sewage water from one or more environmentally hazardous organic substances, such as instance drug molecules, plasticizers, flame retardants, herbicides, pesticides, fungicides, cosmetics, fabrics additives, etc, comprising the steps of:
  a) providing one or more polynucleotide(s) encoding one or more enzymes having the capacity to eliminate an environmentally hazardous organic substance;
  b) producing the enzymes recombinantly in an organism transformed with a vector, such as a plasmid, comprising the polynucleotide from a), wherein the enzyme is produced by said organism, thereby obtaining an enzyme solution;
  c) adding the enzyme solution to a filter, wherein the filter comprises a material having the capacity to bind the enzyme(s), wherein the enzyme(s) bind(s) covalently to said material, which filter is to be put in contact with water to be purified from the environmentally hazardous organic substances;
  d) using the filter in a sewage water treatment system wherein water is to be purified from one or more environmentally hazardous organic substances, such that the filter enzymatically reduces and/or eliminates the one or more environmentally hazardous organic substances from the water.

Furthermore, the present invention provides for a filter suitable for purifying sewage water from one or more environmentally hazardous organic substances, such as drug molecules, plasticizers, flame retardants, herbicides, pesticides, fungicides, cosmetics, fabrics additives, etc., comprising a $H_2O$ stable open-cell foam material, and one or more enzymes covalently bound to said material, wherein the filter is suitable to be placed in a module system within a sewage water treatment system, such that the water will flow through one or more filters, thereby purifying the sewage water from one or more environmentally hazardous organic substances to an extent of at least 60-95%, preferably at least 75-95%, even more preferably at least 80-95%.

The material of the filter is preferably chosen from the group consisting of polyvinyl alcohol, cotton-cellulose, cellulose foam, polyethylene imine and polyester/polyurethane.

The filter according to the present invention comprises enzymes with an ability to eliminate one or more environmentally hazardous organic substances such as drug molecules chosen from the group comprising Ciprofloxacin, Citalopram, Clarithromycin, Diclofenac, Erythromycin, Estradiol, Etinylestradiol, Fluconazole, Ibuprofen, carbamazepine, ketoconazole, Levonorgestrel, Losartan, Metoprolol, methotrexate, Naproxen, Oxazepam, sertraline, sulfametoxazole, Tramadol, Trimetroprim, Zolpidem, Ketoprofen, Risperidone, Fluoxetine, Venlafaxine, ofloxacin, Doxycycline, norfloxacin and Tetracycline.

The one or more enzymes covalently bound to the filter material are chosen from the group comprising of Laccase, Lignin Peroxidase, Epoxide hydrolase, P450 BM3, Melamine Deaminase, Acetoacetate decarboxylase, Dehalogenase and LinB.

Additionally, the present invention provides for the use of a filter according to the above, wherein water flowing through the filter will come in contact with the one or more enzymes presented on the surface of the material of the filter, such that the enzymes may eliminate any environmentally hazardous organic substances, such as drug molecules, plasticizers, flame retardants, herbicides, pesticides, fungicides, cosmetics, fabrics additives, present in said water.

Furthermore, the present invention provides for a module system (10) comprising an inlet (1), at least one filter chamber (2), an outlet (3), a first valve (4) connected to each filter chamber upstream thereof for regulating the flow of water from the inlet to the filter chamber, and a second valve (5) connected to each filter chamber downstream thereof for regulating the flow of water from the filter chamber to the outlet, each filter chamber (2) comprising a top portion (6), a bottom portion (7), a wall surface (8; 8a; 8b; 8c), and a hatch (9), wherein the module system is connected to a water treatment system such that water to be treated is led to the inlet (1), allowing said water to flow through the inlet (1) to the at least one filter chamber (2), and thereafter flow through to the outlet (3) of the module system, wherein each said at least filter chamber (2) comprises a filter according to the above.

BRIEF DESCRIPTION OF THE DRAWINGS

FIG. 1: Module system according to one embodiment of the invention

DETAILED DESCRIPTION

Environmentally hazardous organic substances are present in sewage water due to the utilisation thereof by our society. It may relate to organic substances used within the manufacturing of consumer products, such as for instance flame retardants, plasticizers, fabrics additives, or to organic substances used within agriculture, such as herbicides, pesticides, fungicides, etc. It may also relate to drug molecules that are excreted by the users into the sewage water, via bodily fluids, faeces etc. It may further relate to antibacterial agents used within cosmetics, or hygiene products such as soap, shampoo etc., which may enter the water from the manufacturing or usage thereof. Regardless of the origin of the environmentally hazardous organic molecules, the environmentally hazardous organic molecules of interest within the present invention are molecules that have been identified to pose a threat to the environment and/or aquatic life, and that are difficult to eliminate from sewage water using present techniques. For instance the European Directives 2008/105/EG addresses the problem and lists a number of environmentally hazardous organic molecules that are prioritized to be eliminated from water.

With sewage water is meant water carrying waste from the community. It may relate to domestic or municipal waste water which consists mostly of greywater, blackwater, soaps and detergents, and toilet paper. Greywater comprises water from sinks, tubs, showers, dishwashers, and clothes washers. Blackwater comprises the water used to flush toilets, combined with the human waste that it flushes away, The environmentally hazardous organic substances used within the manufacturing of consumer products that are of interest for elimination from sewage water may for instance be nonylphenol, Bisphenol A or PFAS (Per- and polyfluoroalkyl substances).

Nonylphenol is a not easily biodegradable substance, used in manufacturing antioxidants, lubricating oil additives, laundry and dish detergents, emulsifiers, and solubilizers, and may also be present in for instance textiles. It is banned within the EU, but imported items from outside of the EU may still contain the substance. Nonylphenol plays a potential role as an endocrine disruptor and xenoestrogen, due to its ability to act with estrogen-like activity. Nonylphenol is easily bioaccumulated in the organisms coming in contact with the substance.

Bisphenol A is employed to make certain plastics and epoxy resins, and has been used in for instance many food and beverage cans. It has been shown that Bisphenol A exhibits estrogen mimicking, hormone-like properties, but also neurological effects and cancer has been indicated.

PFAS (Per- and polyfluoroalkyl substances) are chemicals that are used to produce smooth, water resistant, fat resistant surfaces, but is also present in for instance fire extinguishing foam. PFAS may be degraded to perflourated alkylic acids (PFAA), which in turn is not degradable and thus may accumulate in organisms. They have been shown to cause liver damage and may also influence fat metabolism, the immune system and the reproduction capability.

The drug molecules of interest to be eliminated from sewage water are numerous and comprise for instance antibiotics, anti-depressive agents, anti-inflammatory agents, hormones, anti-fungal agents, bloodpressure agents, antineoplastic agents (anti-cancer), sedatives, painkillers.

Antibiotics are of particular interest for elimination from sewage water as a part of the struggle to combat the development of antibiotic resistance. Examples of antibiotics that are of interest to be eliminated from sewage water are for instance Ciprofloxacin, Clarithromycin, Erythromycin, sulfametoxazole, Trimetroprim, ofloxacin, Doxycycline, norfloxacin and Tetracycline.

Examples of anti-depressive agents that are of interest to be eliminated from sewage water are for instance Citalopram, sertraline, Fluoxetin and Venlafaxin.

Examples of anti-fungal agents that are of interest to be eliminated from sewage water are for instance Fluconazole and ketoconazole.

Examples of anti-inflammatory agents that are of interest to be eliminated from sewage water are for instance Diclofenac, Ibuprofen, Naproxen, Ketoprofen and methotrexate.

Examples of bloodpressure agents that are of interest to be eliminated from sewage water are for instance Losartan and Metoprolol.

Examples of hormones that are of interest to be eliminated from sewage water are for instance Estradiol, Etinylestradiol and Levonorgestrel.

An example of painkillers that is of interest to be eliminated from sewage water is for instance Tramadol.

Examples of sedatives that are of interest to be eliminated from sewage water are for instance Zolpidem, Risperidon, Carbamazepin and Oxazepam.

According to the present invention, polynucleotides coding for enzymes able to eliminate the environmentally hazardous organic substances above are obtained. A criteria for said enzymes to be used within the present invention is that they possess the ability to exert their activity during the following conditions:
1. within a temperature range of +8° C.-20° C.;
2. within a pH range of 5.5-8.5; and
while maintaining an activity of at least $10^3$ $s^{-1}$ $M^{-1}$ ($k_{cat}/K_m$).

Enzymes

One or more polynucleotides are provided, encoding one or more enzymes having the capacity to eliminate an environmentally hazardous organic substance. This is done by a method comprising identification, selection and modification of enzymes that may be used to eliminate environmentally hazardous organic substance.

In order to screen an enzyme library in search for a suitable enzyme to be used in the elimination of an environmentally hazardous organic substance, the chemical structures involved in biological activity for the environmentally hazardous organic substances are identified. Then a database for enzyme activity is searched through for identifying enzymes with activity against similar structures as those chemical structures that have been identified to be involved in the biological activity above. Examples of databases to be used for such a search are for instance ExPaSy or BRENDA.

In a first step in the identification of an enzyme, the chemical functional groups that are essential for the biological activity of the environmentally hazardous organic substance, such as alcohols, carboxyl acids, esters, halogens etc. are identified. In a second step, the type of enzymes that are able to digest such a chemical functional group is identified. It relates to digestion of —OH, —COOH, —C—O—C, etc. In a third step, the carbon backbone structure of the environmentally hazardous organic substance is compared to the carbon backbone structure of the substrates that are or known to be digested by the enzyme. This is to ensure that the environmentally hazardous organic substance may be able to fit into the binding site of the enzyme, and that instance no sterical hindrance exists.

Once identified, the enzymes are acquired for further testing of their activity against the correlating environmentally hazardous organic substance. The enzymes may be purchased in a produced, purified form. The enzyme may also be purchased as a polynucleotide in a plasmid or a vector, which will facilitate the mutagenesis of the polynucleotide and allows for a choice of expression system or expression organism. It is also possible to acquire the organism originally producing the enzyme, for in-house sequencing and subsequent expression in any expression system. There are a great number of commercial channels through which enzymes, polynucleotides encoding the enzymes, or organisms producing the enzymes may be purchased, which are known to the person skilled in the art.

Enzymes that show an activity against the environmentally hazardous organic substance are selected to be used in the method according to the present invention. For an enzyme to show an activity against the environmentally hazardous organic substance, and thus having a capacity to eliminate said environmentally hazardous organic substance, said enzyme needs to digest the environmentally hazardous organic substance at the functional chemical groups identified according to the above. The presence of a substrate after reaction of the substrate with an enzyme is usually detected by means of mass spectrometry. However, any other means known to the skilled person for this purpose may also be used. In order to determine if an enzyme is eligible for the method according to the invention, an elimination capacity is thus determined. This elimination capacity is determined by measuring the degree of elimination of the substrate at a concentration of 1 U enzyme, in relation to the substrate, and 100 μmol of environmentally hazardous organic substance, after 1 hour of reaction within a temperature range of +8° C.-20° C. and within a pH range of 5.5-8.5. A reduction of 15% of the environmentally hazardous organic substance, and thus an elimination capacity of 15%, must be observed for the enzyme to be selected for the method according to the present invention.

The aim of the method according to the present invention is to provide selected enzymes that possess, or are modified through mutagenesis to possess, the ability to exert their activity against the environmentally hazardous organic substances during the following conditions:
within a temperature range of +8° C.-20° C.;
within a pH range of 5.5-8.5;
with an activity of at least $10^3$ $s^{-1}$ $M^{-1}$ ($k_{cat}/K_m$).

Thus all three criteria of temperature, pH and enzymatic activity according to the above must be fulfilled. These are the preset criteria that must be met by an enzyme in order to be able to be used against the environmentally hazardous organic substances.

An enzyme that shows an activity, and thus an elimination capacity of at least 15%, against the correlating environmentally hazardous organic substance, but do not initially fulfil all of the three above mentioned criteria, will be subject to a mutagenesis process comprising the following steps:
1. The original gene for the identified enzyme is acquired through DNA synthesis, or by PCR starting from the origin species.
2. The enzyme gene then go through a mutagenesis for obtaining new mutated enzyme genes that may fulfil the above specified criteria
3. The mutated enzyme genes are transformed into a *E. coli* host with vector DNA containing the mutated enzyme gene.
4. An appropriate aliquot of *E. coli* host cells is spread on LB (Lysogeny broth)-plate containing a suitable antibiotic to obtain well-isolated colonies and thus create a mutation library.
5. Single colonies of host cells are picked and inoculated into LB media in a 96-well plate and stored overnight in 30° C.
6. Aliquots of host cells culture are transferred into a new 96 well plate containing TB (Terrific broth) and inducer agent and cultivated over night at 30° C.
7. The host cells are centrifuged down and resuspended in buffer containing Lysozyme and DNase and centrifuged down again to obtain a supernatant comprising any enzyme produced.
8. The supernatant from step 7 is used for testing enzyme activity against the correlating environmentally hazardous organic substance within the criteria specified above, 9. Best performing mutations are selected and restarted from step 2 until all three criteria have been fulfilled.

All of the material and reagents used in the method according to the invention are within common knowledge within the technical field, and may be obtained from commercial channels.

DNA syntheses or PCR processes as performed in step 1 are part of the common general knowledge within the field, and the person skilled in the art will be readily able to perform any of the methods currently used within the field.

The mutagenesis used in step 2 may be any methods disclosed in Salazar, O. et. al., Evaluating a Screen and Analysis of Mutant Libraries, *Methods in Molecular Biology*, vol. 230: *Directed Enzyme Evolution: Screening and Selection Methods*. The skilled person is able to readily make use of the methods disclosed therein for the purpose of the mutagenesis according to the invention.

In step 3, the transformation of the *E. coli* with the vector comprising a mutated strain gene for the enzyme can be done according to any transformation commonly used within the field, and can be chosen from for instance electroporation, gene gun technique, agitation with glass beads, ultrasound and shock waves.

An enzyme that, after mutagenesis and subsequent testing according to the above, do not fulfil the requirement of meeting the criteria of temperature, pH and enzymatic activity against the substrate, may be subject to further mutagenesis until the requirement is fulfilled.

An enzyme that in the initial screening is shown to already have an activity of at least $10^3$ $s^{-1}$ $M^{-1}$ ($k_{cat}/K_m$) at the specified temperature and pH intervals, does not need to be subjected to the mutagenesis and can be directly used for the purpose of eliminating environmentally hazardous organic substances from water within water treatment plants or systems.

The following table 1 lists enzymes used in the present invention, identified and/or modified according to the above, as well as the environmentally hazardous organic substances that are eliminated by the use of said enzymes within the present invention.

activity above are transformed into a production host. The methods of transformation of the production host are common to the person skilled in the art and may for instance be electroporation, gene gun technique, agitation with glass beads, ultrasound and shock waves. The production host must have ability for extra-cellular transport of the enzyme produced from the polynucleotide transformed above. Such a production host may be for instance *E. coli, Bacillus subtilis* or Yeast.

A signal peptide is a short peptide present in an N-terminus of a protein, such as an enzyme, rendering the protein destined towards a specific secretory pathway in a cell. The signal peptide may direct, or translocate, the protein to a specific compartment of the cell. It may also direct the protein to the cell membrane for transport through channels within the cell membrane, such that the protein is transported to the exterior of the cell. Thus an extra-cellular transport of the protein is achieved.

In order for the produced enzyme according to the present invention to be transported to the outside of the host cell, the polynucleotide must be coupled to a signal peptide responsible for directing the extra-cellular transport of the enzyme in a correct manner. There are a large amount of signal peptides known to the person skilled in the art that may be used to direct the transport to the outside of the cell. The skilled person will thus be able to choose an appropriate signal peptide dependent on which enzyme that is to be produced, as well as the vector plasmid and the host cell used for the production, in order to ensure an extra-cellular transport or translocation.

It is also possible to produce the enzymes in a cell-free expression system. In such a case, the polynucleotide is provided in a vector suitable for expression of the polynucleotide in such a system. Systems and materials for cell-free expression are well-known to the skilled person who will be readily available to apply such a production to the present invention.

Regardless of the system used for enzyme production, the culture or reaction supernatant will comprise the enzymes produced. According to the present invention, said superna-

| Enzyme | Origin species | Activity against following compounds |
|---|---|---|
| Laccase | *Trametes Ochracea* | Bisphenol A, Diclofenac, Estradiol, Ciprofloxacin, Doxycycline, Levonorgestrel, Oxazepam |
| Lignin Peroxidase | *Trametes Vesicolorum* | Metoprolol, Propranolol, Clarithrymocin, Trimetoprim |
| Epoxide hydrolase | *Rhodococcus Rhodochrous* | Carbamazepine, Trimetoprim |
| P450 BM3 | *E. coli* DE10 | Metorpolol, Propranolol |
| Melamine Deaminase | | sertraline, sulfametoxazole, Trimetoprim |
| Acetoacetate decarboxylase | Human | Ibuprofen, methotrexate, Naproxen, Ketoprofen, Ofloxacin |
| Dehalogenase LinB | *Sphingobium japonicum* | Citalopram, Fluconazole, ketoconazole, Losartan, norfloxacin |

Production of Enzymes

Polynucleotides encoding one or more enzymes that fulfil the criteria above, and identified and/or modified according to the above, are placed in a vector plasmid comprising an extra-cellular signal peptide using conventional genetic engineering techniques within the art.

The vector plasmids carrying one or more polynucleotides encoding one or more enzymes that fulfil the criteria of tant can be used in the next step of adding the enzymes to a filter, without the need of any purification of the supernatant.

The Filter

The filter according to the present invention comprises a material that is water resistant and suitable for covalent binding of the enzyme to the surface thereof. The material used as the solid support for the filter should furthermore have a foam structure, preferably an open cell foam structure, and the material has to have enough rigidity to form a 3D structure that may be inserted into a flow through chamber, but still adapt to the shape of said chamber. It is also important that the material of the filter has a flow through capacity of at least 1000 m³ water per m³ material per 24 hours. Preferably the filter comprises polyvinyl alcohol, cellulose based material, polyethylene imine and/or polyester/polyurethane.

The binding, or immobilization, of the enzymes to the filter material is accomplished by activating or opening up side chains in the material such that the enzymes may covalently bind thereto. The filter material and methods for binding or immobilizing the enzymes to the filter material is described below.

Materials for the Filter and for Immobilization of Enzymes

The immobilization is designed as a chemically stable attachment between the enzyme and the solid support.

For the present invention, $H_2O$ stable open-cell foam materials are used which have functionalisable groups (nucleophile/electrophile) orthogonal to the main polymeric backbone, alternatively utilizing a functionality that does not interfere with the structural stability of the linear polymeric backbone.

Relevant Functionalities:

| Category | Material | Chemistry | Enzyme functionality |
|---|---|---|---|
| A | ●—OH | Alkylation of polymer using epichlorohydrin, chloroacetic acid or oxidation of alcohol to carbonyl. BrCN* | Amine as nucleophile (Lys) formation of secondary amine, amide or imine. |
| B | 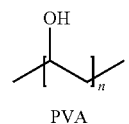 | Electrophilic species (see above), oxidation of alcohol to carbonyl. BrCN* | Amine as nucleophile (Lys), see above. |
| C | ●—◁O | Nucleophilic ring opening using amine or hydroxyl. Ammonia or ethylene diamine can be used for reductive amination with NaCNBH₃ | Amine (Lys) or hydroxyl (Ser/Thr) as nucleophile |
| D | ●—C(=O)H | Amine can be used for imine formation followed by reduction using NaCNBH₃ or NaBH₄ | Amine as nucleophile (Lys) |
| E | ●—C(=O)OH | Activation of carboxyl functionality using EDC/NHS or chlorination/NHS for the formation of amides. | Amine as nucleophile (Lys) |
| F | —N● | Glutaraldehyde or alkylhalide can be used for functionalization. Alternatively, maleic anhydride for thiol attachment | Amine as nucleophile (Lys) or thiol as nucleophile (Cys) |

*BrCN (cyanogen bromide) is an established immobilization technique and will therefore be readily understandable for the skilled person within the art.

Polyvinyl Alcohol

The structure of polyvinyl alcohol (PVA) provides hydroxyl functionalities for covalent attachment through $S_N2$ attack on alkyl halide or oxidation of the alcohol to aldehyde followed by $S_N2$ attack by amines. PVA belongs to Cat A (see table above) in its native form but can assume any of the other categories through covalent functionalization using the appropriate alkyl halide.

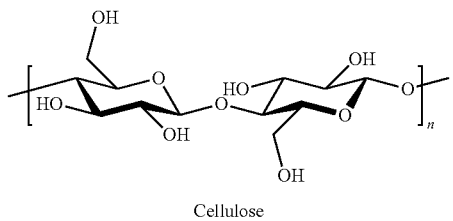

PVA

Cotton-Cellulose

The structure of cotton fibers consists of cellulose containing free hydroxyls available for nucleophilic attack similarly to PVA. Cellulose also belongs to Cat A but additionally contains bis-hydroxyls of the character found in Cat B.

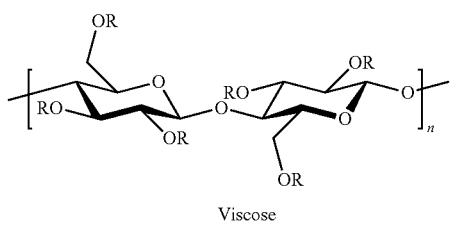

Cellulose

Cellulose Foam

This is similar to cotton cellulose although the commercial cellulose foam contains a mixture of cellulose and viscose (cellulose where the hydroxyls have been modified by carbon disulfide). It is potential material for functionalization although the loading capacity is limited by the amount of viscose in the foam.

Viscose
R = CS₂

Polyethylene Imine

Polyethylene imine (PEI) provides amine functionalities for covalent attachment through $S_N2$ attack on alkyl halide or oxidation of the alcohol to aldehyde followed by $S_N2$ attack by amines. PEI belongs to Cat. F. The drawback of PEI is that it is not commercially available as a foam but has been used in lab-scale experiments as a gel. It has the potential to work in conjunction with glutaraldehyde for immobilization purposes if it can be sourced as a foam.

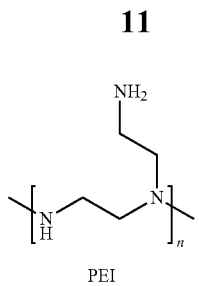

PEI

Polyester/Polyurethane

Polyester/polyurethane (PE/PU) provides functionalities susceptible to nucleophilic attacks by amines that result in the formation of a new amide/urea bond. These materials are commercially available as foams, but suffer from the drawback of loss of structural stability on the macro-scale with increasing funtionalisation which limits its application.

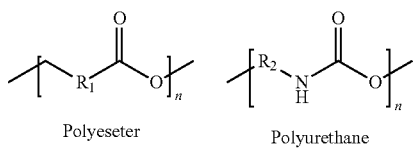

Polyeseter    Polyurethane

The Synthetic Strategy

The chemical syntheses that are of interest for the immobilization of enzymes are summarized below.

The schematic representation of the reactions for functionalization of hydroxyl containing materials from Cat A/B:

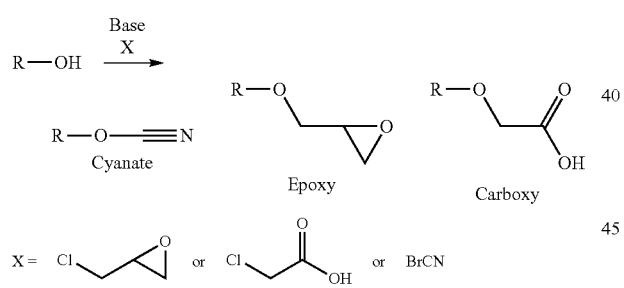

This is representative of the functionalization of PVA or cellulose. The individual reactions for each functionalization are illustrated below.

Enzyme attachment using the well-established method of BrCN activation followed by nucleophilic attack for materials from Cat A/B:

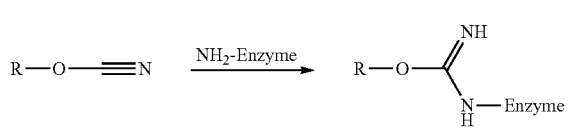

Ring-opening of epoxide from the previous scheme using amines from the enzymes illustrates the functionalization of materials in Cat C. Alternatively, ring-opening of epoxide through hydrolysis yields Cat B materials:

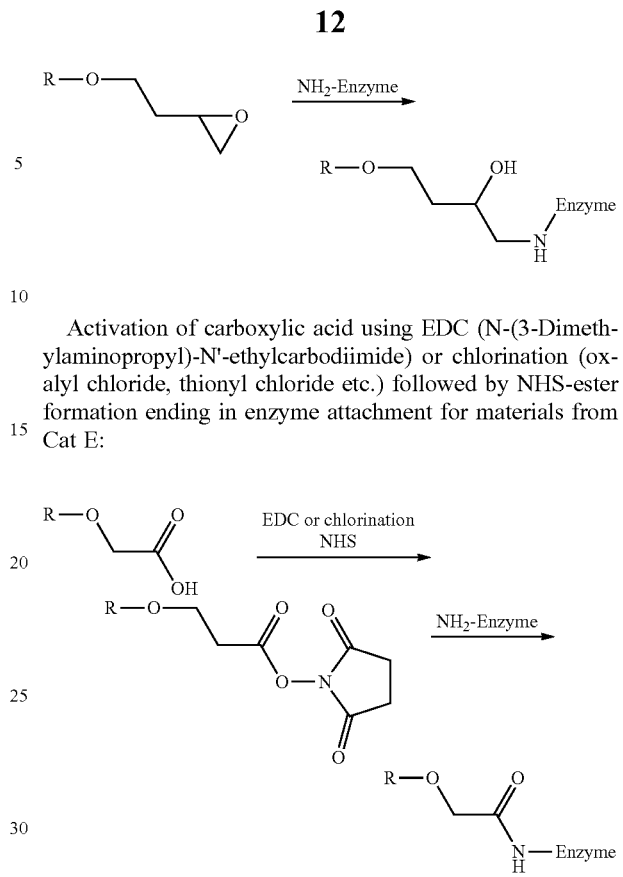

Activation of carboxylic acid using EDC (N-(3-Dimethylaminopropyl)-N'-ethylcarbodiimide) or chlorination (oxalyl chloride, thionyl chloride etc.) followed by NHS-ester formation ending in enzyme attachment for materials from Cat E:

The final approach is oxidation of the hydroxyl to an aldehyde or a ketone followed by a nucleophilic attack using an amine. This covalent bond can be made more stable by reducing the imine to a secondary amine. This demonstrates the principle for functionalizing materials from Cat D.

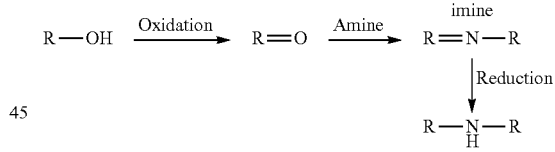

The functionalization of cellulose falls under this category.

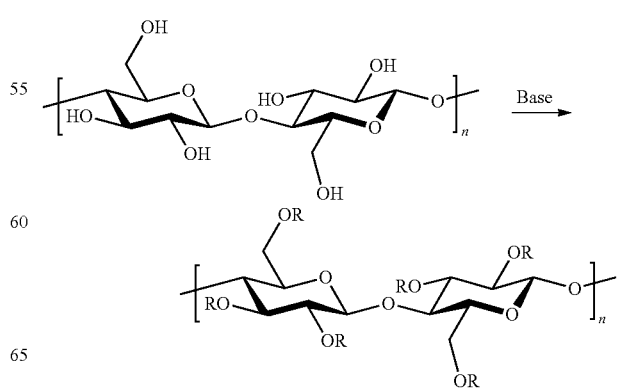

-continued

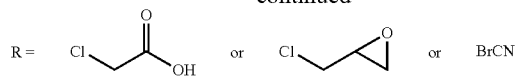

The oxidation of cellulose using sodium periodate (NaIO$_4$) is a potential synthetic route to obtain aldehyde anchoring points for enzymes.

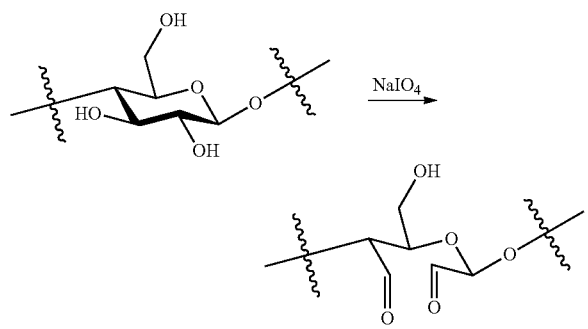

The final method of functionalisation utilises materials containing free amine functionalities. The amine can be used as a nucleophile to attach any electrophilic functionality, see Cat A/B synthesis above. Alternatively, the amine can be used to form an imine and subsequently reduced to obtain a stable secondary amine bond. The polymer PEI is a potential candidate for this functionalisation and represents the materials in Cat F. Following the reduction the material can be treated as a Cat D material.

Immobilization of the Enzymes

The enzyme solution added to the filter solid support material is a combination of enzyme solutions obtained by the method above for production of enzymes, the combination being dependent on the eliminating activity that is desired for the filter. By combining solutions with all of the identified enzymes and adding this combined solution to the filter, most of the environmentally hazardous molecules will be eliminated using said one filter.

The solid support for the filter is any of the materials disclosed above. Once the filter has the enzymes covalently bound thereto, the filter has been activated and is ready to be used in a water treatment system.

Thus a filter is provided comprising one or more enzymes covalently bound to the material, which is suitable to be used within a water treatment module to be placed in a water treatment plant.

Water Purification Process

The activated filter is used in a sewage treatment plant for degradation of substances. The activated filter should be able to remove at least 60-95%, preferably at least 75-95%, even more preferably at least 80-95% of the environmentally hazardous organic substances during a process in a sewage treatment plant. The process is through setting up a system that controls the flow of water to go through filters according to the invention, such that the enzymes are presented to and can react with substances in the water. This could be through a pipe where the water is flowing through, or a designed system to direct the flow into chambers where the filter is residing.

Module System

According to the present invention, a module system (10) to be installed in a water treatment system plant is provided. The module (10) comprises an inlet (1), for allowing water to be treated to enter the module, at least one filter chamber (2) through which the water is to flow, and an outlet (3) for allowing the water to exit the module. Each filter chamber comprises a filter according to the above. A first valve (4) is connected to each filter chamber upstream thereof, for regulating the flow of water from the inlet to the filter chamber. A second valve (5) is connected to each filter chamber downstream thereof for regulating the flow of water from the filter chamber to the outlet. Each filter chamber comprises a top portion (6), a bottom portion (7), and a wall surface (8) comprising a hatch (9). The hatch (9) may be opened, such that the interior of the filter chamber (2) may be easily accessed from the outside. The hatch (9) is attached by means of hinges and locked shut by fastening means, or any equivalent means for attachment and fastening known to the person skilled in the art, which may easily be opened.

The top portion (6) has a larger surface than the bottom portion (7). This is important as it will lead to a direction of the water flow within the chamber from the top portion (6) to the bottom portion (7).

According to one embodiment, the wall surface (8) may comprise of one circular side wall, with a circular cross section. In such a case, the filter chamber (2), and thus the filter being used within the chamber (2) will have a shape of a truncated cone with a circular cross section.

According to a second embodiment, the wall surface (8) may comprise of one side wall that is oval or elliptic in cross section. In such a case, the filter chamber (2), and thus the filter being used within the chamber (2) will have a shape of a truncated cone with an oval or elliptic cross section.

For the first and second embodiments it is important that the hatch (9) is large enough to open up a sufficient part of the chamber for the filter therein to be easily accessed and changed.

According to a third embodiment, shown in FIG. 1, the wall surface (8) may be square or quadratic shaped in cross section, and comprise of 3 side walls (8a, 8b, 8c), wherein a fourth side wall comprises the hatch (9). In this case, the filter chamber (2), and thus the filter being used within the chamber (2), will have the shape of an inverted isosceles trapezoid. In a variant of the third embodiment, the wall surface may be rectangular in cross section.

It is important that the filter shape is the same as the filter chamber shape, such that the fitting of the filter within the chamber is facilitated, and the formation of side channels between the filter and the side walls thus prevented.

The module system is connected to a water treatment system such that water to be treated is led to the inlet (1), allowing said water to flow through the inlet (1) to the at least one filter chamber (2), and thereafter flow through to the outlet (3) of the module system, allowing the water to exit the module system.

The filters according to the present invention are replaceable. The valves (4; 5) connected to the filter chamber (2) allows for regulating the water flow through the filter chamber (2), and a complete shut-off thereof, such that it enables service of the module (10) and the filter chamber (2), and in particular facilitates changing of the filter comprised in the filter chamber (2).

Each filter unit can be used within the module system for at least 1 week and up to 3 months. Thereafter, the activity of the enzymes immobilized on the filter will have decreased to a level below the threshold level of 75% discussed above. The filters then have to be exchanged with new filters. The exchange of filters is done by opening the hatch (9) of the filter chambers (2), whereby the interior of the filter chamber (2) is exposed and the filter may easily be exchanged.

The volume of the filter chamber (2) is typically about 0.2 m³. This enables a facilitated management of each chamber (2) during the change of filters. For instance change of filter is facilitated as the volume of water to be drained at the time of changing the filter is not so large.

The module system (10) may further be provided with an overflow channel (11). If the module system (10) at any time experience a stop of flow in a chamber (2), or if too much water is led into the system, said over flow channel (11) allows for a bypass of water by breaking bursting discs therein (not shown) so that the module system (10) is not damaged in any way.

The module system (10) may additionally be provided with a flow meter (not shown), in order to monitor the flow. Such a flow meter may be used to determine at what point to test the activity of the filters to determine if a filter needs to be replaced. It may for instance relate to a point where a certain volume of water has passed through the filter in the filter chamber (2).

The invention claimed is:

1. A filter for purifying sewage water flowing through said filter from a plurality of environmentally hazardous organic substances, said filter comprising:
   a H2O stable open-cell foam material, and
   a plurality of enzymes covalently bound to the H2O stable open-cell foam material, wherein said plurality of enzymes have the ability to eliminate said plurality of environmentally hazardous organic substances upon contact with said sewage water comprising said plurality of environmentally hazardous organic substances chosen from drug molecules in the group of ciprofloxacin, citalopram, clarithromycin, diclofenac, erythromycin, estradiol, etinylestradiol, fluconazole, ibuprofen, carbamazepine, ketoconazole, levonorgestrel, losartan, metoprolol, methotrexate, naproxen, oxazepam, sertraline, sulfametoxazole, tramadol, trimetoprim, zolpidem, ketoprofen, risperidone, fluoxetine, venlafaxine, ofloxacin, doxycycline, norfloxacin and tetracycline, and
wherein said plurality of enzymes will eliminate said plurality of environmentally hazardous organic substances present in said sewage water,
wherein the plurality of enzymes are chosen from a group consisting of Epoxide hydrolase, P450 BM3, Melamine Deaminase, Acetoacetate decarboxylase, and LinB, and
wherein the plurality of enzymes have the ability, or are modified through mutagenesis to possess the ability, to eliminate the plurality of environmentally hazardous organic substance(s) at a pH in a range of 5.5 to 8.5 and a temperature in a range of +8° C. to 20° C., while maintaining an activity against the environmentally hazardous organic substances of at least $10^3$ $s^{-1}M^{-1}$ ($k_{cat}/K_m$) and
said filter having the ability to purify the sewage water from said drug molecules to an extent of 60-95%.

2. The filter according to claim 1, wherein the H2O stable open-cell foam material is chosen from one or more materials in the group consisting of polyvinyl alcohol, cellulose based material, polyethylene imine, and polyester/polyurethane.

3. The filter according to claim 1, wherein the H2O stable open-cell foam material comprises polyvinyl alcohol.

4. The filter according to claim 1, wherein the H2O stable open-cell foam material comprises cellulose foam.

5. The filter according to claim 1, wherein the H2O stable open-cell foam material comprises cotton-cellulose foam.

6. The filter of claim 1, wherein the filter has the ability purify the sewage water from said drug molecules to an extent of 75-95%.

7. The filter of claim 1, wherein the filter has the ability to purify the sewage water from said drug molecules to an extent of 80-95%.

8. A method of using the filter according to claim 1, comprising flowing the sewage water through the filter to come in contact with the plurality of enzymes presented on the surface of the H2O stable open-cell foam material of the filter, such that the plurality of enzymes eliminate the plurality of environmentally hazardous organic substances present in said sewage water.

9. A module system comprising:
   an inlet,
   at least one filter chamber,
   an outlet,
   a first valve connected to each filter chamber upstream thereof for regulating a flow of sewage water from the inlet to the at least one filter chamber, and
   a second valve connected to each filter chamber downstream thereof for regulating a flow of water from the at least one filter chamber to the outlet,
each filter chamber comprising a filter according to claim 1, and
each filter chamber comprising a top portion, a bottom portion, a wall surface, and a hatch, such that the flow of sewage water to be treated is led to the inlet, allowing said sewage water to be treated to flow through the inlet to the at least one filter chamber, and thereafter flow through to the outlet of the module system.

10. A module system according to claim 9, additionally comprising an overflow channel comprising a bursting disc.

11. A module system according to claim 9, additionally comprising a flow meter.

12. A method of using a module system according to claim 9, to purify the sewage water from the plurality of environmentally hazardous organic substances, chosen from drug molecules.

13. A method of purifying sewage water from a plurality of environmentally hazardous organic substances, comprising the steps of:
   a) providing one or more polynucleotide(s) encoding a plurality of enzymes, chosen from a group consisting of epoxide hydrolase, P450 BM3, melamine deaminase, acetoacetate decarboxylase and LinB, and wherein the plurality of enzymes are modified to eliminate the plurality of environmentally hazardous organic substances at a pH in a range of 5.5 to 8.5 and a temperature in a range of +8° C. to 20° C. having the capacity to eliminate the plurality of the environmentally hazardous organic substances, chosen from drug molecules, while maintaining an activity against the environmentally hazardous organic substances of at least $10^3$ $s^{-1}M^{-1}$ ($k_{cat}/K_m$);
   b) producing the plurality of enzymes recombinantly in an organism transformed with a vector, comprising the one or more polynucleotides from a), wherein the plurality of enzymes is produced by said organism, thereby obtaining an enzyme solution;
   c) adding the enzyme solution to a filter, wherein the filter comprises a material having the capacity to bind the plurality of enzymes, wherein the material of the filter is a H2O stable open-cell foam material, wherein the plurality of enzymes bind(s) covalently to said material, wherein the filter is to be put in contact with the sewage water to be purified from the plurality of environmentally hazardous organic substances;

d) using the filter in a sewage water treatment system wherein the sewage water is to be purified from the plurality of environmentally hazardous organic substances, such that the filter enzymatically the plurality of environmentally hazardous organic substances from the sewage water to an extent of 60-95%.

14. The method according to claim 13, wherein the vector in step b) comprises a signal peptide coupled to the one or more polynucleotides encoding the plurality of enzymes, and wherein the signal peptide directs an extracellular transport of the plurality of enzymes.

15. The method according to claim 13, wherein the organism is capable of extracellular production of the plurality of enzymes, so that the plurality of enzymes are transported by the organism to a supernatant in a culture of said organism.

16. The method according to claim 13, wherein the plurality of enzymes is/are recombinantly produced by *E. Coli, Bacillus* species or in yeast.

17. The method according to claim 13, wherein the enzyme solution obtained in step b) is a culture supernatant comprising the plurality of enzymes, which is directly added to the filter in step c) in order to covalently bind the plurality of enzymes in the filter.

18. The method according to claim 13, wherein in step c) said material, comprised in the filter, is chosen from a group consisting of polyvinyl alcohol, cellulose based material, polyethylene imine, and polyester/polyurethane.

19. The method according to claim 13, wherein the material comprises polyvinyl alcohol.

20. The method according to claim 13, wherein the material of the filter comprises cotton-cellulose or cellulose foam.

* * * * *